US008182779B2

(12) United States Patent
Hill

(10) Patent No.: US 8,182,779 B2
(45) Date of Patent: May 22, 2012

(54) PROCESS FOR REMOVING PHOSPHORUS-CONTAINING COLLOIDS AND THEIR PRECURSORS FROM IRON CHLORIDE SOLUTIONS

(75) Inventor: Peter Hill, Woodstown, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 220 days.

(21) Appl. No.: 12/760,193

(22) Filed: Apr. 14, 2010

(65) Prior Publication Data

US 2010/0264366 A1 Oct. 21, 2010

Related U.S. Application Data

(60) Provisional application No. 61/171,214, filed on Apr. 21, 2009.

(51) Int. Cl.
*C01G 49/00* (2006.01)

(52) U.S. Cl. ........ 423/299; 423/300; 423/301; 423/302; 423/303; 423/304; 423/322; 210/702

(58) Field of Classification Search .......... 423/299–304, 423/322; 210/702
See application file for complete search history.

(56) References Cited

U.S. PATENT DOCUMENTS

| 2,446,181 A | 8/1948 | Kraus |
| 2,701,179 A | 2/1955 | McKinney |
| 3,591,333 A | 7/1971 | Carlson et al. |
| 3,975,495 A | 8/1976 | Bowerman |
| 5,032,367 A * | 7/1991 | Hirai et al. .............. 423/142 |
| 5,200,159 A * | 4/1993 | Hirai et al. .............. 423/140 |
| 5,407,650 A | 4/1995 | Hartmann et al. |

FOREIGN PATENT DOCUMENTS

| JP | 63315519 | 12/1988 |
| JP | 63315522 | 12/1988 |

OTHER PUBLICATIONS

Gupta et al., Factors Affecting the Degree of Phosphate-Removal in the System Ferric Chloride-Orthophosphate and Nature of the Precipitates Swiss Fed. Res. Stn. Agric. Chem. Hyg. Environ. 1979.
Glasser et al., "Fluidized Bed Chlorination of Rutile" Society of Mining Engineers of Aime, Sep. 9, 1962.
Barksdale, "Titanium: Its Occurrence, Chemistry and Techology" Ronald Press 1996, pp. 400-462.

* cited by examiner

Primary Examiner — Steven Bos

(57) ABSTRACT

The disclosure provides a process for removing phosphorus-containing colloids and their precursors from an iron chloride solution comprising: (a) heating the iron chloride solution comprising impurities selected from the group consisting of phosphorus-containing colloid, phosphorus-containing colloid precursor, and mixtures thereof, at a temperature of about 100° C. to about 300° C., at least autogenous pressure and for a period of time sufficient to transform the impurities into a filterable solid; and (b) separating the solid from the iron chloride solution. In one embodiment, the iron chloride solution is a byproduct of the chloride process for making titanium dioxide.

19 Claims, No Drawings

PROCESS FOR REMOVING PHOSPHORUS-CONTAINING COLLOIDS AND THEIR PRECURSORS FROM IRON CHLORIDE SOLUTIONS

BACKGROUND OF THE DISCLOSURE

1. Field of the Disclosure

The present disclosure relates to a process for removing phosphorus-containing colloids and their precursors from iron chloride solutions, and more particularly to a process for removing phosphorus-containing colloids and their precursors from iron chloride solutions as filterable products.

2. Background of the Disclosure

In the chloride process for the manufacture of titanium dioxide, acidic metal chloride solutions (containing predominately iron chloride) are formed. These are generally disposed by neutralization, dewatering, and landfill, or deep-welled as hazardous waste after solids removal by settling and/or filtration. In some cases, the solutions are purified and sold as ferrous chloride or ferric chloride solutions, which are used as coagulants in wastewater and potable water treatment. These iron chloride solutions contain chlorides and oxychlorides of titanium, niobium, and zirconium. Macromolecular clusters of titanium, niobium, zirconium or their mixtures with water, chloride, and hydroxide may also form. These clusters typically continue to grow with time, eventually leading to fine precipitates. When phosphorus is also present, it reacts with chlorides and oxychlorides of titanium, niobium, and zirconium or the macromolecular clusters containing these metals to form extremely fine phosphorus-containing colloids. These fine precipitates cause extreme difficulties in solids removal processing of iron chloride solutions by blinding filters, causing slow filtration rates, or interfering with flocculation and settling. These difficulties can lead to titanium dioxide production rate reductions or plant shutdowns. Fine phosphorus-containing precipitates can also cause problems in storage and handling of commercial iron chloride solutions at customers' sites as the precipitates settle and subsequently clog tanks, strainers, and pumping lines. This equipment then needs to be taken out of service for cleaning, incurring costs and interruption of service.

A need thus exists for an improved process for separating impurities such as phosphorus-containing colloids and their precursors from these iron chloride solutions in the form of readily filterable solids.

SUMMARY OF THE DISCLOSURE

In a first aspect, the disclosure provides a process for removing phosphorus-containing colloids and their precursors from an iron chloride solution comprising:
(a) heating the iron chloride solution comprising impurities selected from the group consisting of phosphorus-containing colloid, phosphorus-containing colloid precursor, and mixtures thereof, at a temperature of about 100° C. to about 300° C., and at least autogenous pressure to transform the impurities into a filterable solid; and
(b) separating the filterable solid from the iron chloride solution.

By "autogenous pressure" is meant a pressure at least partially developed by retaining some vapors produced during the heating. The autogenous pressure will vary with the composition of the iron chloride solution.

By 'filterable solid' we mean a solid that has discrete particle sizes greater than about 1 micron and discernable under a scanning electron microscope when collected on a filter, as opposed to the contiguous slime or gel network observed when a filtered phosphorus-containing colloid is examined under a scanning electron microscope. The production of filterable solid will allow commercial filtration operations to be conducted at economically reasonable filtration rates.

In the first aspect, separating the filterable solid from the iron chloride solution is accomplished by filtration, settling, or centrifugation.

In a second aspect, the disclosure provides a process for removing impurities selected from the group consisting of phosphorus-containing colloid, phosphorus-containing colloid precursor and mixtures thereof, from an iron chloride solution having an iron concentration of about 50 to about 250 grams/liter comprising:
(a) reacting ore comprising metal oxides with chlorine and a carbon compound at a temperature of about 900° C. to about 1300° C. to form a gaseous stream comprising the chlorides of the metal and off gases comprising carbon monoxide;
(b) cooling the gaseous stream to form solids comprising iron chloride and a compound selected from the group consisting of phosphorus-containing compound, niobium compound, titanium compound, zirconium compound and mixtures thereof;
(c) quenching the solids formed in step (b) to form an iron chloride solution, having an iron concentration of about 50 to about 250 grams/liter, and comprising impurities selected from the group consisting of a phosphorus-containing colloid, phosphorus-containing colloid precursor, and mixtures thereof;
(d) heating the iron chloride solution comprising the impurities at a temperature of about 100° C. to about 300° C., and at least autogenous pressure to transform phosphorus-containing colloid, phosphorus-containing colloid precursor, and mixtures thereof into a filterable solid; and
(e) separating the filterable solid from the iron chloride solution.

DETAILED DESCRIPTION OF THE DISCLOSURE

Titanium dioxide ($TiO_2$) powder that may be in the rutile or anatase crystalline form is commonly made by either a chloride process or a sulfate process. In the chloride process, titanium tetrachloride ($TiCl_4$) is oxidized to $TiO_2$ powders. The chloride process is described in greater detail in "The Pigment Handbook", Vol. 1, 2nd Ed., John Wiley & Sons, NY (1988), the teachings of which are incorporated herein by reference. The powder may be pigmentary, nano, or ultrafine particles. Iron chloride solutions that are a byproduct of the chloride process contain a major proportion of iron chloride comprising ferrous chloride, ferric chloride, or a mixture thereof in solution with a minor proportion of impurities such as titanium, vanadium, niobium, zirconium, chromium, and aluminum. When phosphorus is also present in solution or as a solid material soluble in the solution, the niobium, titanium, and zirconium impurities react with soluble phosphorus to form troublesome phosphorus-containing colloids. These impurities are generally present at anywhere from about 100 ppm to about 1 percent by weight, based on the entire weight of iron chloride solution, depending on the ore composition and plant operation.

It has been found that the phosphorus-containing colloids and their precursors can be removed, leaving a stable and filterable iron chloride solution, having an iron concentration of about 50 to about 250 grams/liter, more typically 75 to 200 grams/liter, by heating the iron chloride solution resulting from the chloride process and comprising the phosphorus-containing colloids and their precursors, in a vessel, typically a substantially closed vessel. Some suitable substantially closed vessels include autoclaves or continuous flow pipeline reactors. The heating is conducted at a temperature of about 100° C. to about 300° C., more typically at a temperature of about 200° C. to about 250° C. This heating occurs at least autogenous pressure and for a period of time sufficient to precipitate the phosphorus-containing colloid precursors as a readily filterable solid, and transform any phosphorus-containing colloids present into a readily filterable solid. Some suitable pressures include about 200 to about 1400 psig, more typically 500 to about 800 psig. Some suitable periods of time include about 1 to about 120 minutes, more typically 3 to about 30 minutes. After heating under the specified conditions, the solid formed is separated, leaving behind an iron chloride solution that is devoid of the troublesome impurities comprising phosphorus-containing colloids and their precursors. The separation of the solid from the iron chloride solution may be accomplished by filtration, settling, or centrifugation. Some suitable equipment used for the separation includes filters, settlers, or centrifuges such as filter presses manufactured by Andritz, clarifiers manufactured by FL Smidth Minerals, or centrifuges manufactured by Alfa Laval.

In one specific embodiment, the iron chloride solution comprising phosphorus-containing colloids or their precursors may be obtained during the production of titanium tetrachloride. Ore comprising metal oxides and a carbon compound such as coke are fed into a fluidized bed reactor and reacted in the presence of chlorine to form a gaseous stream comprising the chlorides of metals found in the ore and off gases comprising carbon monoxide, and optionally solids such as ore and carbon fines that are entrained in the gaseous stream. The reaction occurs at a temperature of about 900° C. to about 1300° C. to form the corresponding chlorides and off gases comprising carbon monoxide. The chlorides formed are then cooled in stages to first condense and remove iron chloride and chlorides of other metals other than titanium tetrachloride in the form of solids. Solids entrained in the gaseous stream may comprise fine ore particles comprising phosphorus compounds. These chlorides and fine ore particles in the form of solids may be separated from the gaseous stream using a spray condenser or a cyclone. This chlorination process is described in more detail in U.S. Pat. No. 2,701,179; U.S. Pat. No. 3,591,333; U.S. Pat. No. 2,446,181 and Titanium: Its Occurrence, Chemistry and Technology, by Jelks Barksdale, Ronald Press (1966). Fluidized bed chlorination is described in more detail in "Fluidized Bed Chlorination of Rutile" by Jay Glasser and W. L. Robinson, Society of Mining Engineers of AIME, Sep. 9, 1962.

The solids so separated are then quenched to form an iron chloride solution, having an iron concentration of about 50 to about 250 grams/liter, and comprising phosphorus-containing colloids, their precursors, or mixtures thereof. Quenching may be accomplished by mixing dilute hydrochloric acid or water with the separated solids. This iron chloride solution is then treated by heating it in a vessel, such as a substantially closed vessel, at a temperature of about 100° C. to about 300° C., more typically at a temperature of about 200° C. to about 250° C. This heating occurs at least autogenous pressure and for a period of time sufficient to precipitate the compound as a solid. Some suitable pressures include about 500 to about 800 psig. Some suitable periods of time include about 1 to about 120 minutes. The so precipitated solids are then separated from the iron chloride solution.

EXAMPLES

It has been found that doping acidic iron chloride samples comprising niobium, titanium, and zirconium compounds with small amounts of phosphoric acid reliably generates phosphorus-containing colloids that are extremely detrimental to filterability of the iron chloride. The use of this technique allows the study of phosphorus-induced filter blinding without needing to wait for production plant upsets to collect samples of phosphorus-impacted iron chloride solutions as feedstocks for such work. Phosphorus-impacted samples will regain acceptable filterability over time upon standing, as the extremely fine colloids slowly grow into larger particles through agglomeration, Ostwald ripening, or other mechanisms. The first 3 examples use the phosphate doping approach to generating phosphorus-containing colloids.

Example 1

Slurry Filtration after 20 Minutes of Heat Treatment

A sample of iron chloride slurry (iron chloride solution containing several percent mineral sands and coke insoluble solids) from a $TiO_2$ plant was filtered with and without treatments to demonstrate the ability of the process to recover filterability of iron chloride impacted by phosphorus-containing colloids.

Control sample—iron chloride slurry was heated to 60° C. and filtered at 10 psig nitrogen pressure through a 47 mm diameter nominal 0.45 micron mixed cellulose ester filter membrane. This sample filtered normally.

Phosphorus-doped sample—iron chloride slurry was heated to 60° C., doped with 85% phosphoric acid solution to add 0.22 grams phosphorus/liter, and held for 2 hours at 60° C. to form phosphorus-containing colloids. This sample was filtered at 10 psig nitrogen pressure through a 47 mm diameter nominal 0.45 micron mixed cellulose ester filter membrane. This sample filtered much more slowly than the control sample.

Treated phosphorus-doped sample—iron chloride slurry was heated to 60° C., doped with 85% phosphoric acid solution to add 0.22 grams phosphorus/liter, and held for 2 hours at 60° C. to form phosphorus-containing colloids. This slurry was then heated to 250° C., held for 20 minutes, and allowed to cool overnight. The slurry was then removed from the autoclave, agitated to resuspend solids, heated to 60° C., and filtered at 10 psig nitrogen pressure through a 47 mm diameter nominal 0.45 micron mixed cellulose ester filter membrane. This sample filtered even more quickly than the control sample.

Results are shown in Table 1.

TABLE 1

Effect of phosphate ameliorated by 20 minutes of heating
FeClx slurry, 0.45 micron filtration, 10 psig

| sample treatment | filtration rate of 90 grams filtrate, grams/minute |
|---|---|
| slurry as-is | 7.5 |
| slurry doped with phosphate | 1.4 |
| slurry doped with phosphate, heated at 250° C. for 20 minutes | 16.4 |

Example 2

Supernatant Filtration after 20 Minutes of Heat Treatment

Using samples from the same batch of starting iron chloride slurry as in Example 1, we filtered supernatants from this slurry with and without treatments to demonstrate the ability of the process to recover filterability of iron chloride impacted by phosphorus-containing colloids.

Control sample, supernatant—iron chloride slurry was allowed to settle for 1 hour, supernatant was drawn off, heated to 60° C., and the supernatant was filtered at 10 psig nitrogen pressure through a 47 mm diameter nominal 0.45 micron mixed cellulose ester filter membrane. This sample filtered normally, though much faster than the slurry in Example 1, since there was very little filter cake of insoluble solids formed to restrict passage of filtrate.

Phosphorus-doped sample, supernatant—iron chloride slurry was heated to 60° C., doped with 85% phosphoric acid solution to add 0.22 grams phosphorus/liter, and held for 2 hours at 60° C. to form phosphorus-containing colloids. The sample was allowed to settle for one hour, supernatant was drawn off, heated to 60° C., and the supernatant was filtered at 10 psig nitrogen pressure through a 47 mm diameter nominal 0.45 micron mixed cellulose ester filter membrane. This sample filtered much more slowly than the control sample.

Treated phosphorus-doped sample, supernatant—iron chloride slurry was heated to 60° C., doped with 85% phosphoric acid solution to add 0.22 grams phosphorus/liter, and held for 2 hours at 60° C. to form phosphorus-containing colloids. This slurry was then heated to 250° C., held for 20 minutes, and allowed to cool overnight. The slurry was then removed from the autoclave, agitated to resuspend solids, allowed to settle for 1 hour, supernatant drawn off, heated to 60° C., and supernatant filtered at 10 psig nitrogen pressure through a 47 mm diameter nominal 0.45 micron mixed cellulose ester filter membrane. This sample filtered rapidly, slightly more quickly than the control sample.

Results are shown in Table 2.

TABLE 2

Effect of phosphate ameliorated by 20 minutes of heating
FeClx supernatant after settling 1 hour, 0.45 micron filtration, 10 psig

| sample treatment | filtration rate of 70 grams filtrate, grams/minute |
| --- | --- |
| supernatant as-is | 160 |
| slurry doped with phosphate, settled, supernatant filtered | 14 |
| slurry doped with phosphate, heated to 250° C. for 20 minutes, settled, supernatant filtered | 176 |

Example 3

Slurry Filtration after 5 Minutes of Heat Treatment

Using a sample from the same batch of starting iron chloride slurry as in Examples 1 and 2, we filtered this slurry with and without treatments to demonstrate the ability of the process to recover filterability of iron chloride impacted by phosphorus-containing colloids, at lower treatment time.

270 grams of iron chloride slurry were doped with 85% phosphoric acid solution to add 0.22 grams phosphorus/liter, and held for 2 hours at 60° C. to form phosphorus-containing colloids. The sample was cooled to room temperature, agitated to resuspend solids, and split into two subsamples.

Phosphorus-doped subsample—one phosphorus-doped subsample was heated to 60° C. and filtered at 10 psig nitrogen pressure through a 47 mm diameter nominal 0.45 micron mixed cellulose ester filter membrane. This sample filtered slowly, as expected.

Treated phosphorus-doped subsample—the other phosphorus-doped subsample was heated to 250° C., held at that temperature for 5 minutes, and allowed to cool overnight. Pressure during heating reached 700-750 psig. The slurry was then removed from the autoclave, agitated to resuspend solids, heated to 60° C., and filtered at 10 psig nitrogen pressure through a 47 mm diameter nominal 0.45 micron mixed cellulose ester filter membrane. This subsample filtered rapidly, 10 times as fast as the untreated phosphorus-doped subsample.

Results are shown in Table 3.

TABLE 3

Effect of phosphate ameliorated by 5 minutes of heating
FeClx slurry, 0.45 micron filtration, 10 psig

| sample treatment | filtration rate of 100 grams filtrate, grams/minute |
| --- | --- |
| slurry doped with phosphate | 1.8 |
| slurry doped with phosphate, heated at 250° C. for 5 minutes | 18.0 |

Example 4

Iron chloride supernatant from a TiO$_2$ plant was collected during a filter blinding incident and stored for 8 months. A 100 mL subsample was taken, heated to 60° C., and filtered at 10 psig air pressure through a 47 mm diameter nominal 0.45 micron mixed cellulose ester filter membrane. This sample filtered about 100 grams filtrate at 24 grams per minute. Separately, another subsample was taken and heated to 250° C., and held at that temperature for 30 minutes, and cooled. 100 mL of this treated iron chloride was filtered at 10 psig air pressure through a 47 mm diameter nominal 0.45 micron mixed cellulose ester filter membrane. This sample filtered about 100 grams filtrate at 2.3 grams per minute. In this case, the heat treatment of an 8 month old iron chloride sample decreased filterability. It is believed that this TiO$_2$ plant blinding iron chloride sample that was put aside for long-term storage regained its filterability due to colloid settling, Ostwald ripening, or other mechanisms.

What is claimed is:

1. A process for removing phosphorus-containing colloids and their precursors from an iron chloride solution comprising:
   (a) heating the iron chloride solution comprising impurities selected from the group consisting of phosphorus-containing colloid, phosphorus-containing colloid precursor, and mixtures thereof, at a temperature of about 100° C. to about 300° C., and at-least autogenous pressure to transform the impurities into a filterable solid; and
   (b) separating the filterable solid from the iron chloride solution.

2. The process of claim 1 wherein the separating of the filterable solid is accomplished by filtering, settling, or centrifuging.

3. The process of claim 1 wherein the heating is conducted at a temperature of about 200° C. to about 250° C.

4. The process of claim 1 wherein the at least autogenous pressure is about 500 to about 1400 psig.

5. The process of claim 4 wherein the at least autogenous pressure is about 500 to about 800 psig.

6. The process of claim 1 wherein the iron chloride solution comprising impurities is heated for about 1 to about 120 minutes.

7. The process of claim 6 wherein the iron chloride solution comprising impurities is heated for about 3 to about 30 minutes.

8. A process for removing impurities selected from the group consisting of phosphorus-containing colloid, phosphorus-containing colloid precursor and mixtures thereof, from an iron chloride solution having an iron concentration of about 50 to about 250 grams/liter comprising:
   (a) reacting more comprising metal oxides with chlorine and a carbon compound at a temperature of about 900° C. to about 1300° C. to form a gaseous stream comprising the chlorides of the metal and off gases comprising carbon monoxide;
   (b) cooling the gaseous stream to form solids comprising iron chloride and a compound selected from the group consisting of phosphorus-containing compound, niobium compound, titanium compound, zirconium compound and mixtures thereof;
   (c) quenching the solids formed in step (b) to form an iron chloride solution, having an iron concentration of about 50 to about 250 grams/liter, and comprising impurities selected from the group consisting of a phosphorus-containing colloid, phosphorus-containing colloid precursor, and mixtures thereof;
   (d) heating the iron chloride solution comprising the impurities, in a vessel, at a temperature of about 100° C. to about 300° C., and at least autogenous pressure to transform phosphorus-containing colloid, phosphorus-containing colloid precursor, and mixtures thereof into a filterable solid; and
   (e) separating the filterable solid from the iron chloride solution.

9. The process of claim 8 wherein the carbon compound is coke.

10. The process of claim 8 wherein the solids are separated in a spray condenser or a cyclone.

11. The process of claim 8 wherein the quenching is accomplished by adding dilute hydrochloric acid or water to the solids.

12. The process of claim 8 wherein the separating of the solid in step (e) is accomplished by filtering, settling, or centrifuging.

13. The process of claim 8 wherein the heating is conducted at a temperature of about 200° C. to about 250° C.

14. The process of claim 8 wherein the at least autogenous pressure is about 200 to about 1400 psig.

15. The process of claim 14 wherein the at least autogenous pressure is about 500 to about 800 psig.

16. The process of claim 8 wherein the iron chloride solution comprising impurities is heated for about 1 to about 120 minutes.

17. The process of claim 16 wherein the iron chloride solution comprising impurities is heated for about 3 to about 30 minutes.

18. The process of claim 8 wherein the vessel is a substantially closed vessel that is selected from the group consisting of an autoclave and a continuous flow pipeline reactor.

19. The process of claim 8 wherein the phosphorus-containing compound is selected from the group consisting of chlorides of phosphorus, oxychlorides of phosphorus, fine particles of ore comprising phosphorus, and mixtures thereof.

* * * * *